United States Patent Office 3,278,494
Patented Oct. 11, 1966

3,278,494
POLYMERIZATION OF PLURALITY OF AQUEOUS SOLUTIONS OF POLYAMIDE - FORMING REACTANTS WITH A CONTINUOUSLY DECREASING PRESSURE
Reginald M. Lodge, Bryn, Abergavenny, England, assignor to British Nylon Spinners Limited, Pontypool, Monmouthshire, England
No Drawing. Filed Mar. 15, 1963, Ser. No. 265,335
Claims priority, application Great Britain, Mar. 27, 1962, 11,546/62
6 Claims. (Cl. 260—78)

The present invention relates to the manufacture of high molecular weight linear polyamides by the condensation polymerization of monomers which are polymethylene diammonium salts of dibasic aliphatic acids or which are omega-amino aliphatic carboxylic acids, and more particularly to a continuous process for carrying out said polymerization.

The expression "high molecular weight linear polyamides" is intended to signify that the degree of polymerization of the polyamides is sufficiently great for them to be capable of being melt-spun into filaments and includes interpolyamides. The aforesaid degree of polymerization is reached when at least about 90–95% of the theoretical total water of chemical condensation, i.e. of the maximum water theoretically available, has been eliminated by the condensation reaction.

As compared with a batch process or discontinuous process for polymerizing the above-mentioned monomer salts or amino acids, for example, hexamethylene diammonium adipate, a continuous process offers a number of advantages, both economic and technical, for instance, the production of a polyamide of uniform high quality. Numerous attempts have accordingly been made to design a continuous process satisfactory for this purpose. Now a continuous process involves the introduction of monomer into an apparatus wherein it is continuously polymerized at suitably raised temperatures, conveniently known as polymerization temperatures, the resulting polyamide constantly issuing from said apparatus. The monomers which are polymethylene diammonium salts of dibasic aliphatic acids or omega-amino aliphatic carboxylic acids are normally introduced into the apparatus in the form of aqueous solutions. The polyamide produced may be withdrawn from the apparatus as a molten stream but it is frequently found desirable to melt-spin the polyamide issuing from the apparatus through a spinneret (with its usual accompanying filter) into filaments because the necessity to re-melt the polyamide is thus avoided and it is also possible to minimise the time during which the polyamide is maintained in a molten condition and so lessen the tendency for degradation to occur. For this purpose it is the practice to maintain a reservoir of polyamide which supplies the spinneret.

Specification No. 7,279/61 describes and claims a continuous process for the manufacture of high molecular weight linear polyamides by the condensation polymerization of a monomer which is a polymethylene diammonium salt of an aliphatic alpha,omega-dicarboxylic acid containing from 8 to 24 carbon atoms or which is an omega-amino aliphatic carboxylic acid ocntaining from 6 to 12 carbon atoms, comprising pumping an aqueous solution of said monomer into the entry end of a long narrow tube heated to polymerization temperatures so that the material polymerizes as it passes through the tube, wherein the pressure is at least 14 atmospheres at the entry end of said tube, continuously decreases along the tube and falls to substantially atmospheric or subatmospheric pressure at the exit end of said tube but always permits the evolution of steam which is derived from the aqueous solution or the water of condensation, and at any point in the tube has a value constituting a continuous monotonic single-value function of the distance of said point along the tube, the rate of passage of the polymerizing material through the tube being such that at least 90% of the total theoretical water of chemical condensation is evolved during said passage, and optionally further heating the material issuing from the exit end of the tube to complete the polymerization of the polyamide, and melt-spinning the resulting polyamide into filaments, films, ribbons and like shaped objects.

By the phrase "narrow tube" is to be understood a tube having an internal diameter not exceeding 2.5 cm. A suitable diameter is 1.2 cm. The diameter of the tube need not be uniform; it can increase from the inlet towards the outlet. Moreover the tube may possess any convenient shape, e.g. a spiral positioned vertically or horizontally. The vertical spiral can be traversed by the polymerizing mass in an upward or downward direction. The material of which the tube is constructed is conveniently one not subject to corrosion by the polymerizing mass and may be, for instance, stainless steel. The tube must be capable of withstanding a high pressure which may, for example, reach 28 atmospheres at the entry end. The other tube or vessel into which the aforesaid narrow tube leads, can take the form of a tube of larger internal diameter or else may constitute a vessel in which the molten polymer collects under atmospheric pressure, and from which it is melt-spun into filaments or drawn off for use as required.

Now the economic and technical advantages of continuous polymerization depend on the process running continuously and steadily for long periods without variation in the conditions which would vitiate the uniform quality of the polymer. Melt-spinning operations, however, cannot be conducted indefinitely because, sooner or later, the spinneret with its accompanying filter has to be detached for cleaning. Whilst the fresh spinneret is being fitted either the molten polyamide issuing from the apparatus must be allowed to form waste polymer, or the outflow must be stopped. It needs hardly pointing out that the former alternative is uneconomic and the latter would cause the level of molten polyamide in the reservoir which precedes the spinneret to rise. The level of polyamide could be restored to its normal position by reducing the rate of flow of the polymerizing mass through the apparatus but it will be apparent that, other conditions remaining the same, the period of heating will be inversely proportional to the rate at which the polymerizing mass passes through the apparatus, that is to say, to the rate of introduction of the monomer solution. Any change in this rate will therefore alter the period of heating and the alteration may constitute an important fraction of the total period of heating i.e. of the total reaction time and thus disturb the process to the detriment of the polyamide. The latter case is particularly likely to occur when the apparatus is wholly or at least to a large extent in the form of a long narrow tube as described below. A change in rate of introduction of the monomer solution is also apt to disturb the rate of heat transfer in the polymerization apparatus and the resulting equilibrium temperature. Thus for a given apparatus one cannot advisedly alter or adjust the rate of production of polymer *merely* by altering the rate of introduction of the monomer solution since the conditions of polymerization and therefore the properties of the resulting polymer are thereby undesirably affected. In other words the desired steady conditions of polymerization no longer obtain.

It has now been found that, although the conditions of polymerization in a continuous process depend, especially in the case of narrow tube apparatus, on the rate of introduction of the monomer solution, that is to say, monomer solution of a given concentration, it is possible to vary the rate of introduction of the monomer itself by introducing a plurality of aqueous solutions of the monomer of different concentrations and varying the proportions in which said solutions are introduced, without any important effect on the said conditions, providing the total volume of solution introduced in a given unit of time is kept constant or very nearly so. For example, two different aqueous solutions of monomer differing in percentage concentration (calculated on the solution) by 10 to 20 may be employed; or else a strong solution together with water (regardable as a solution of zero concentration) may be chosen. The use of the word solution in this connection is accordingly intended to include water and aqueous solutions devoid of monomer. In this way the rate of production of polyamide, i.e. the rate at which it issues from the polymerization apparatus, can be adjusted or regulated without affecting the conditions of polymerization so as to spoil the quality of the polyamide.

Particularly convenient is the regulation of the rate of production of polyamide in continuous polymerization by introducing a plurality of aqueous solutions of the monomer of different concentrations when the polyamide issuing from the polymerization apparatus is further heated in a small reservoir or other vessels and then melt-spun into filaments, films, ribbons and like shaped objects, because in this way the molten polyamide in the reservoir or other vessels can be maintained at a constant level or nearly so despite occasional interruptions to the melt-spinning due to renewal of the spinneret and filter.

Apart from the disturbance to a continuous polymerization occasioned by altering the rate of introduction of the monomer solution, already discussed above, further complication occurs when the monomer is a polymethylene diammonium salt of a dibasic aliphatic acid. This is because it is then necessary for the monomer to be accompanied by some additional quantity of the polymethylene diamine (i.e. an excess over the stoichiometrical quantity forming the salt) in order to compensate for the inevitable loss of diamine due to volatilisation during the polymerization. Now the quantity of diamine lost is also affected by the rate of introduction of the monomer solution especially in the case of a narrow tube apparatus. In fact in the latter apparatus it can be shown that the loss rises at an increasing rate when the rate of introduction of the monomer solution is increased. Change of the said rate consequently necessitates an adjustment of the excess of diamine added. The process of the invention wherein the rate of introduction of monomer solution measured by volume is kept constant has a beneficial effect also in respect of the diamine excess, for much less adjustment is necessary. Indeed in the particular case of hexamethylene diammonium adipate, it is found curiously enough that no adjustment in the diamine excess is required, a most advantageous circumstance.

Accordingly the invention consists of a continuous process for the manufacture of filaments, films, ribbons and like shaped objects, by making a high molecular weight linear polyamide by the polymerization of a monomer, which is a polymethylene diammonium salt of an aliphatic, alpha,omega-dicarboxylic acid containing from 8 to 24 carbon atoms or which is an omega-amino aliphatic carboxylic acid containing from 6 to 12 carbon atoms, comprising, by the aid of appropriate pumping means, introducing a plurality of aqueous solutions of the monomer of different concentrations (optionally including zero concentration) into the entry end of a long narrow tube (as hereinbefore defined) heated to polymerization temperatures so that the material polymerizes to form a linear polyamide as it passes through the tube, wherein the pressure is at least 14 atmospheres at the entry end of said tube, continuously decreases along the tube and falls to substantially atmospheric or sub-atmospheric pressure at the exit end of said tube but always permits the evolution of steam which is derived from the aqueous solution or the water of condensation, and at any point in the tube has a value constituting a continuous monotonic single-value function of the distance of said point along the tube, the rate of passage of the polymerizing material through the tube being such that at least 90% of the total theoretical water of chemical condensation is evolved during said passage, wherein the polyamide issuing from the exit end of the tube is further heated in a reservoir or other vessels and then melt-spun into filaments, films, ribbons and like shaped objects, and the rate of production of the polyamide is regulated so that the molten polyamide in the reservoir or other vessels is maintained at a constant level or nearly so by varying the proportions in which said solutions of the monomer are introduced, the total volume of solution introduced in a given unit of time being kept constant or substantially so.

The invention includes the filaments, films, ribbons and like shaped objects when so manufactured.

Examples of suitable polymethylene diammonium salts and omega-amino acids for use as monomers in the present process are the following:

hexamethylene diammonium adipate
hexamethylene diammonium sebacate
octamethylene diammonium adipate
decamethylene diammonium adipate
pentamethylene diammonium sebacate
dodecamethylene diammonium adipate
omega-amino caproic acid
omega-amino undecanoic acid Mixtures of monomers may optionally be employed in the present process, e.g., a mixture of hexamethylene diammonium adipate and hexamethylene diammonium sebacate, in which case interpolyamides are produced.

For making a given polyamide it is found in practice that a temperature at least 10° C. above the melting point of the polyamide can be regarded as a suitable polymerization temperature i.e. a temperature at which amide-formation proceeds at a useful rate, provided it be not too high otherwise degradation of the polyamide is likely to occur. The polymerization tube is conveniently surrounded by heating means e.g. a jacket of hot fluid, at one uniform temperature. The temperature in the case of polyhexamethylene adipamide is advantageously from 285° to 290° C. The pressure at the entry end of the tube is preferably between 28 and 34 atmospheres. All pressures quoted are absolute.

The plurality of aqueous solutions of the monomer may consist of two solutions of different concentrations differing by, for example, from 5 to 50% (calculated on the solution). Indeed, as already indicated, one of the solutions may be of zero concentration, i.e., devoid of monomer, and will in this case, in the absence of any other solute, constitute water. At room temperature (17° C.) 47% of hexamethylene diammonium adipate salt dissolves in water, and this solution can be employed in the present process together with, for instance, a 43% solution of the said salt or together with water. If stronger solutions of the monomer are desired, the solution can be heated. In the case of hexamethylene diammonium adipate salt, for example at 111° C., 70 parts by weight of the salt are soluble in 30 parts by weight of water, so as to constitute a solution containing 70% by weight of salt. Clearly the stronger the solutions of monomer, the less water has to be evaporated during the polymerization.

Conventional pumping means are used for introducing the solutions into the polymerization tube. Numerous piping arrangements can be chosen and a given piping arrangement may often be operated in many different ways. Two simple arrangements will be described below by way of illustration, and for convenience they will be referred to as piping arrangement A and piping arrangement B.

PIPING ARRANGEMENT "A"

Each solution of the plurality of aqueous solutions of monomer is forwarded by a separate pump into a common pipe line leading to the polymerization tube.

If, for simplicity, the case of two solutions of monomer of different concentrations be considered, say 40% and 45%, then the rate of production of polyamide may be regulated by simultaneously varying in a continuous or discontinuous manner the rate of output of each pump, by increasing the rate of one whilst decreasing that of the other, so that the total volume of solution passed by both pumps in a given unit of time, remains constant. The variation in the rate of output may be executed slowly or rapidly or practically instantaneously, as may be desired. In fact, one simple mode of operation is to run the pumps alternatively, that is to introduce into the polymerization tube at any given instant either the one monomer solution or the other.

PIPING ARRANGEMENT "B"

In this arrangement a first monomer solution is forwarded by a first pump into the pipe line leading from the supply reservoir of the second monomer solution, the combined first and second monomer solutions are forwarded by a second pump into the pipe line leading from the supply reservoir of the third monomer solution, and so forth. In this case the output of each pump exceeds that of the preceding pump and the output of the last pump is constant.

Thus when only two monomer solutions are used, there are only two pumps and the rate of production of polyamide is regulated by varying the rate of output of the first pump, i.e. the pump forwarding the first monomer solution into the pipe line leading from the supply reservoir of the second monomer solution, the combined solutions being forwarded to the polymerization tube by the second pump which runs at a constant rate of output.

The variation of the rate of output of the first pump may be carried out in various ways, as already explained in connection with piping arrangement A, except that in arrangement A, it is necessary to adjust two pumps when two monomer solutions are used. Thus the rate of production of polyamide may be regulated by running the first pump at one of two given rates of output, the appropriate rate being selected by conventional electronic means governed for example, by a level detecting device situated in the reservoir or other vessels already referred to, which contain the molten polyamide about to be melt-spun. The electronic means may be designed so that the change from one rate of output to the other is not sudden or abrupt, but takes a longer or shorter time, as desired.

It is important to remark that in the case where two monomer solutions are employed and one of them is of zero concentration, i.e. constitutes water of an aqueous solution devoid of monomer, care must be taken to ensure that the supply of monomer to the polymerization tube from the other solution is never wholly interrupted during the polymerization process.

In the present process of manufacture of polyamides by continuous polymerization there may be included in the reaction mixture mono-functional compounds in small quantity, notably monoamines or monobasic acids, e.g. acetic acid, in order to prevent polymerization proceeding beyond the desired degree at elevated temperatures, for example, when the polyamide is held molten for the purpose of melt-spinning. Such monofunctional compounds are known as viscosity stabilizers. Other adjuvants may also be added at any convenient stage of the process, for instance: dyes, pigments, dyestuff formers, heat stabilizers, light stabilizers, plasticizers, delustrants, polyamide and other resins.

The present polyamides may be mixed with other polyamides, whether derived from aliphatic or aromatic intermediates e.g. that derived from 1:4-di-beta-aminoethyl-2:5-dimethylbenzene and sebacic acid, by melting them together.

In the following examples which are by way of illustrating, not limiting, the invention, the percentages are by weight.

Example 1

A narrow coiled polymerization tube of stainless steel, comprising 18 metres of internal diameter 5 mm. followed by 18 metres of internal diameter 7 mm., 30 metres of internal diameter 1.0 cm. and 22.5 metres of internal diameter 2.1 cm. is maintained at 293° C. The exit end of the tube leads into a cylindrical reservoir, 25 cm. in diameter and 60 cm. high, likewise maintained at 293° C. and furnished with a spinneret.

Either the one or the other of the following two aqueous solutions of monomer is pumped into the above polymerization tube, using piping arrangement A, described above, at a rate of 170 cc. per minute.

Solution No. 1: Percent
    Hexamethylene diammonium adipate salt ____ 47.0
    Hexamethylene diamine _____ 0.7
    Water _____ 52.3

Solution No. 2:
    Hexamethylene diammonium adipate salt ____ 43.0
    Hexamethylene diamine _____ 0.7
    Water _____ 56.3

The pressure at the entry end of the tube is 27 atmospheres, the exit end being maintained at atmospheric pressure. The polyamide produced by polymerization in the above tube passes into the reservoir where it forms a pool, and whence it is melt-spun into filaments through the spinneret. The reservoir contains a level detecting device comprising an electrically conducting probe which makes contact with the surface of the molten polyamide in the reservoir when it reaches the desired level. The rate of production of polyamide is regulated by causing the aforesaid probe to select, by conventional electronic means, the appropriate monomer solution, so as to maintain the pool of molten polyamide in the reservoir at the required level.

The efficacy of the process according to the invention is demonstrated by the very small change in properties of the polyamide which occurs when the change is made from one monomer solution to the other, as shown in Table 1, below.

TABLE 1

| Monomer solution used | Property of Polyamide | |
|---|---|---|
| | Relative Viscosity | Amine ends (measured in gram equivalents per million grams) |
| No. 1 | 28.8 | 26.4 |
| No. 2 | 27.2 | 26.6 |

The relative viscosity of a polyamide is defined as the ratio of the viscosity of an 8.4% (solute:solution) solution thereof in 90% (solute:solution) aqueous formic acid to the viscosity of the said aqueous formic acid at the same temperature.

Example 2

Example 1 is repeated except that piping arrangement A is replaced by piping arrangement B, the second pump of which has a constant rate of output of 140 cc. per minute. The rate of polyamide production is regulated by stopping and starting the first pump which introduces monomer solution No. 1. Also, a slightly greater excess of hexamethylene diamine is used than is the case in Example 1, the compositions of the monomer solutions being—

Solution No. 1: Percent
    Hexamethylene diammonium adipate salt ____ 47.0
    Hexamethylene diamine _____ 0.9
    Water _____ 52.1

Solution No. 2:
    Hexamethylene diammonium adipate salt ____ 43.0
    Hexamethylene diamine _____ 0.9
    Water _____ 56.1

The pressure at the entry end of the tube is 24½ atmospheres, the exit end being at atmospheric pressure. Again the properties of the polyamides which result from each of the monomer solutions are very nearly the same as shown in Table 2 so that the quality of the polyamide filaments obtained by the present process is of a high degree of uniformity.

TABLE 2

| Monomer solution used | Property of Polyamide ||
|---|---|---|
| | Relative Viscosity | Amine Ends |
| No. 1 | 40.4 | 56.3 |
| No. 2 | 40.7 | 57.4 |

*Example 3*

The following two solutions are polymerized in the narrow coiled tube of Example 1, to which are connected the cylindrical reservoir and spinneret, as described.

Solution No. 1: Percent
    Hexamethylene diammonium adipate salt ___ 47.0
    Hexamethylene diamine _____ 0.45
    Glacial acetic acid _____ 0.1
    Water _____ 52.45

Solution No. 2:
    Hexamethylene diamine _____ 0.45
    Water _____ 99.55

These solutions are introduced into the above mentioned apparatus by means of piping arrangement B, and the resulting polyamide continuously melt-spun into filaments, the rate of production of polyamide being regulated by a probe in the cylindrical reservoir in the following manner. The probe is caused by suitable known electronic means to select the appropriate rate of output of the first pump, which runs either at 140 cc. per minute or 120 cc. per minute, whilst the second pump has a constant output of 140 cc. per minute, which is of course, the rate of introduction of monomer solution into the polymerization tube. Thus when the first pump runs at its higher speed, none of solution No. 2 is admitted to the polymerization apparatus. The pressure at the entry end of the tube is 24½ atmospheres, the pressure in the cylindrical reservoir being 1 atmosphere.

The uniformity of the properties of the resulting polyamide measured during a period of 24 hours is demonstrated by the fact that the variation in the relative viscosity corresponds to a standard deviation of only 1.0 and the standard deviation in the case of the amine end contents is as little as 0.8.

*Example 4*

Two aqueous solutions of epsilon-aminocaproic acid containing respectively 40% and 47% thereof are pumped alternatively at a rate of 120 cc. per minute into a long narrow polymerization tube of austeritic steel, which has the following internal diameters: 18 metres of 5 mm., followed by 18 metres of 7 mm., 30 metres of 1 cm., and finally 8 metres of 2.1 cm. The pumping is carried out with the aid of piping arrangement A, the rate of production of polyamide being regulated by appropriate choice of the aminocaproic acid solution. The resulting polyamide is melt-spun into filaments. The narrow tube is maintained at a temperature of 290° C. The pressure at the entry end is 16 atmospheres, the exit end, where polyamide is discharged, being open to the atmosphere. The uniformity of the polyamide filaments is excellent inasmuch as the relative viscosity varies between 22 and 23 and the amine end content between 120 and 116 gram equivalents per million grams of polyamide.

What I claim is:

1. In a process for the manufacture of shaped polyamide objects from a high molecular weight linear polyamide made by condensation polymerizing a monomer selected from the group consisting of omega-amino aliphatic carboxylic acids containing from 6 to 12 carbon atoms and polymethylene diammonium salts of aliphatic alpha-omega-dicarboxylic acids containing from 8 to 24 carbon atoms; said process involving the step of introducing an aqueous solution of the monomer into the entry end of a tube which has an internal diameter which does not exceed 2.5 cm. and is heated to the monomer polymerization temperature, whereby the monomer polymerizes and evolves at least 90% of the total theoretical water of chemical condensation as it passes through the tube, the pressure being at least 14 atmospheres at the entry end of said tube, continuously decreasing along the tube and falling at least to substantially atmospheric pressure at the exit end of said tube while always permitting the evolution of steam and at any point in the tube having a value constituting a continuous monotonic single-value function of the distance of said point along the tube, introducing the polyamide passing out of the tube into a reservoir vessel, heating the polyamide in the vessel and melt-spinning the polyamide into shaped objects, the improvement comprising utilizing, as the aqueous solution of the monomer introduced into the tube, a plurality of aqueous solutions of the monomer, wherein the solutions differ in concentration by 5 to 50% by weight, calculated on the solution, and each of the solutions has a concentration of from 0 to about 70% by weight of monomer, and wherein the total volume of solution fed to the tube is about constant but the rate of production of polyamide is varied by varying the proportions in which the monomer solutions are introduced while continuously supplying monomer, whereby the molten polyamide level in the reservoir vessel is kept substantially constant.

2. A process as claimed in claim 1, wherein the polyamide is made by polymerizing hexamethylene diammonium adipate.

3. The process as claimed in claim 1 wherein the plurality of aqueous solutions of the monomer are introduced into the tube by passing the plurality of aqueous solutions of the monomer into a common pipe line leading into the entry end of the long tube, wherein separate pumping means introduce each solution into the common pipe line.

4. A process as claimed in claim 1 wherein a plurality of aqueous solutions of the monomer are introduced into the tube by pumping a first monomer solution by a first pump into a pipe line leading from a supply reservoir of a second monomer solution and the combined first and second monomer solutions are pumped by a second pump into the tube.

5. A process as claimed in claim 1, wherein the number of aqueous solutions of monomer is two.

6. A process as claimed in claim 1, wherein the polyamide is made by polymerizing the monomer hexamethylene diammonium adipate, the number of aqueous solutions thereof is two and the aqueous solutions are introduced into the tube by pumping the first monomer solution by a first pump into the pipe line leading from the supply reservoir of the second monomer solution and the combined first and second monomer solutions are pumped by a second pump into the entry end of the long tube.

References Cited by the Examiner

UNITED STATES PATENTS 2,923,699 2/1960 Indest et al. _____ 260—78
3,193,535 7/1965 Carter _____ 260—78

FOREIGN PATENTS 674,954 7/1952 Great Britain.
853,354 7/1960 Great Britain.

WILLIAM H. SHORT, *Primary Examiner.*

H. D. ANDERSON, *Assistant Examiner.*